United States Patent Office 3,137,160
Patented June 16, 1964

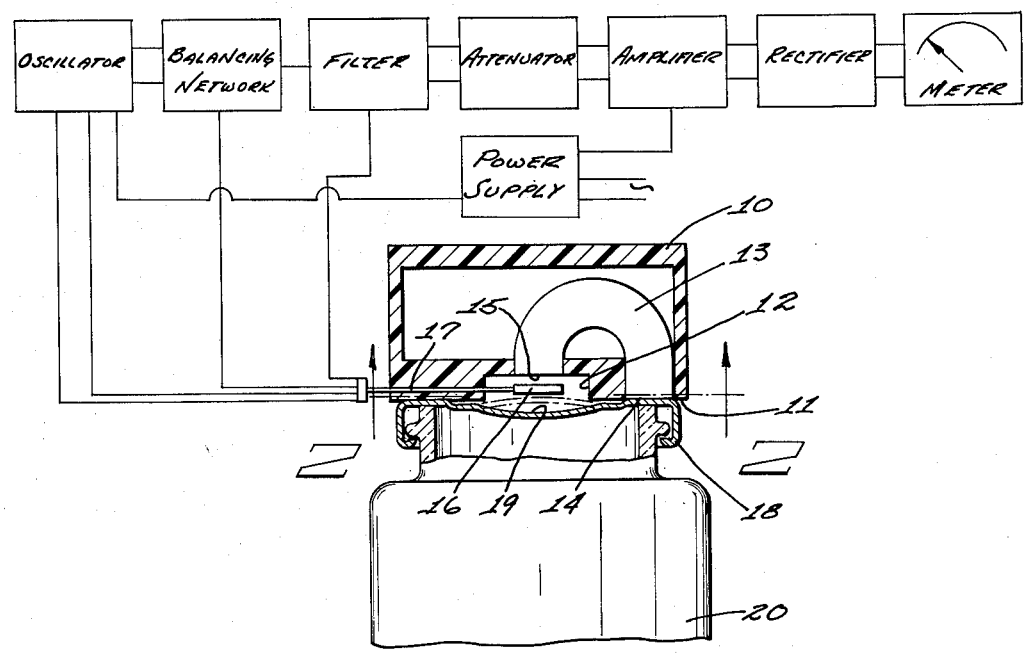
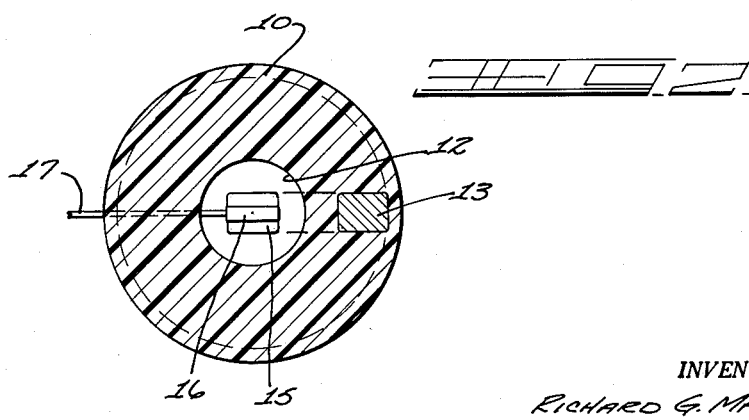

3,137,160
APPARATUS TO DETERMINE VACUUM IN SEALED CONTAINERS
Richard G. Mathias, Toledo, Ohio, assignor to Owens-Illinois Glass Company, a corporation of Ohio
Filed Jan. 5, 1962, Ser. No. 164,566
3 Claims. (Cl. 73—52)

This invention relates to an apparatus for measuring the pressure conditions within a sealed container having a magnetically conducting end closure. More particularly this invention relates to an apparatus for determining the position of the center of a container end closure with respect to its edge. The invention utilizes a magnetic circuit having the end closure as the armature of the circuit and further includes means for indicating the field strength or the flux density of the magnetic circuit as an indication of the amount of vacuum present within a container.

Numerous devices have been previously described in U.S. patents, most of these devices utilize mechanical members which gauge the position of the center portion of the container closure with respect to the outer rims thereof. However, these devices all require relative motion between the container center contacting member and its support to provide an indication of the position of the center of the closure with respect to its edge.

Furthermore in many of these devices, for example that disclosed in U.S. Pat. No. 2,445,176 issued July 13, 1948, the mechanisms are capable of only providing a rough indication of the pressure condition within the container and are primarily utilized only for the purpose of determining whether or not sufficient deflection of the center portion of the container closure is present as an indication of a proper vacuum condition prevailing within the container.

In a number of these devices, gravity is utilized as the biasing force for maintaining the mechanical gauging member in contact with the central portion of the closure and these devices are capable of use only when the container is positioned with its closure in an upright position.

In contrast, applicant's apparatus for measuring the pressure conditions within a sealed container is uneffected by the position of the container, and, in fact, will provide an indication of the pressure condition within a container which is positioned upside down.

With the foregoing in mind it is an object of this invention to provide a method of gauging the pressure condition within a sealed container regardless of the orientation of the container.

It is a further object of this invention to provide an apparatus for indicating, over a range, the pressure condition prevailing within a sealed container having a magnetically conducting end closure.

It is a still further object of this invention to provide an apparatus for determining the degree of vacuum present within a sealed container utilizing a magnetic circuit in which the container closure forms the armature for a generally U-shaped permanent magnet and using a Hall generator to measure the flux density of the magnetic circuit.

It is a still further object of this invention to provide apparatus in the form of a compact inspection head which may be placed over the end closure of a sealed container in combination with a measuring circuit for indicating the degree of vacuum present within the container.

Other and further objects will be apparent from the following disclosure taken in connection with the accompanying drawings wherein:

FIG. 1 is an elevational view partly in section showing the gauging head of the invention applied to the end closure of a container, and FIG. 2 is a cross-sectional view taken at line 2—2 on FIG. 1.

With reference to the drawings, the apparatus of the invention takes the form of a support or head 10 which may be formed of a magnetically non-conducting material such as plastic. The support 10 is generally circular in configuration with a flat bottom surface 11 and a circular recess 12 formed in the bottom portion thereof at its center. A U-shaped or horse-shoe magnet 13 is carried by the support with one leg of the magnet forming a pole face 14 located adjacent the periphery of the support, with the other leg forming a pole face 15 located centrally of the support and coextensive with the upper surface of the recess 12. The pole face 15, as best shown in FIG. 1, lies in a plane which is vertically above the parallel plane containing the pole face 14. A gaussmeter probe 16 is positioned within recess 12 of the support 10 and is located in underlying, spaced relationship with respect to the pole face 15 of the magnet 13. The gaussmeter probe 16 is a product of Radio Frequency Laboratories, Inc., Boonton, N.J. and in essence is a Hall generator which provides a voltage output proportional to the strength of a magnetic field within which the probe is positioned. A description of the probe and its operation is found in "Handbook of Instructions" of the Radio Frequency Laboratories, Inc., Model 1259A Gaussmeter, book No. MA–9300A, published in 1959.

With one such probe (which may be formed of bismuth) when placed in a magnetic field, with current flowing from end to end of the probe and with the magnetic field perpendicular to the probe, the well-known Hall effect will be observed with a voltage drop appearing across the width of the probe. The magnetic field causes the electrons in the probe to travel in curved patterns thus charging up the sides of the probe until the transverse electronic field consists of the right magnitude to cancel the effect of the magnetic field and make the electrons travel through the probe undivided. The magnitude of this potential in volts is expressed by the equation:

$$E = \frac{RIH}{t}$$

where:

I is the current in amperes
H is the magnetic field strength in gausses
t is the thickness of the probe, and
R is the Hall coefficient in volt=CM/ampere gauss.

The probe 16 is mounted on the end of a hollow member 17 which extends through the side of the support 10 and carries the necessary electrical leads running to the probe 16. With the head 10 positioned over a container closure 18, a gap will exist between the pole face 15 and the upper surface 19 of the closure. Thus positioned the closure 18 will serve as an armature for the magnet 13 with the magnet flux lines extending vertically downward from the pole face 15 across the gap and pass into the cap 18. The pole face 14 which is placed in contact with the rim of the cap 18 will complete the magnetic circuit.

With the container 20 under vacuum, the central portion of the closure 18 will be deflected downwardly to the position shown in full lines on FIG. 1. With the center portion of the closure depressed or deflected downwardly under the influence of the vacuum within the container 20, the air gap formed between the pole face 15 and the upper surface 19 of the closure 18 will produce a particular flux density in the magnetic circuit. With the gaussmeter probe 16 positioned in this air gap, the flux density of the magnetic circuit may be measured.

In a situation where the vacuum has been released from within the container 20, the closure 18 will have its central portion deflected upwardly, as shown in phantom line on FIG. 1. With the central portion of the closure deflected upwardly, the air gap within which the probe is positioned will be considerably lessened thus changing the flux density in the magnetic circuit. This change in flux density will be directly reflected in the voltage output of the probe 16.

Thus it can be seen that the position of the central portion of the closure is directly proportional to the flux density of the magnetic field extending from the pole face 15 to the upper surface 19 of the closure.

The particular closure shown in FIG. 1 is of the "flip panel" type wherein the central portion will be depressed as long as a sufficient vacuum is present within the container 20 and upon release of the vacuum or loss of vacuum of a predetermined amount, the resiliency of the panel is such that the central portion of the closure will flip or flex and assume the position shown in phantom line on FIG. 1. For this type of cap, it is only necessary that the sensitivity of the probe and its output voltage be such that it will distinguish between the two positions that the closure will normally assume. In this sense, the measurement takes the form of a "go no-go" type indication. However, it should be pointed out that the actual sensitivity of the device is such that the voltage output of the probe, when properly amplified, will give an accurate indication of the position of the center of the container closure in any of its intermediate positions.

This is of particular value when gauging containers having closures which are not of the "flip panel" type.

The gauging circuit which is connected to the probe by suitable leads connected through the support member 17 is not a part of this invention except insofar as it is a practical way to provide a meter indication of the flux density of the magnetic field. As a specific example of the gauging circuit, reference may be had to the above referred to publication of the Radio Frequency Laboratories, Inc., at pages 8 to 11. The oscillator may be a 3000 cycle oscillator designed to supply a constant current to the current terminals of the probe. The potential or voltage leads are brought from the probe to a 3000 cycle filter with a 600 cycle bank width. A balancing network is provided to inject a small voltage into the pick up loop to balance out the residual resistive unbalance in the probe. The purpose of the filter is to remove harmonic voltage from the signal as generated in the 3000 cycle oscillator and step up the voltage by a factor of 10. A 9-step attenuator permits measurements from 100 gausses to 30,000 gausses. The signal drive for the attenuator is then amplified and rectified with the output from the rectifier being fed to a meter.

The above-recited circuit components form the commercially available gaussmeter designated model 1295A by the Radio Frequency Laboratories, Inc. No further detail with respect to the circuits is believed necessary, it being understood that it is the voltage output of the probe 16 which is being indicated by the meter. When the apparatus of the invention is used to determine the vacuum present within a container having a "flip panel" type closure, the meter may be calibrated in terms of "acceptable" and "non-acceptable" ranges. When it is desired to know the specific vacuum conditions present within a container having a closure whose depression depends upon the amount of vacuum within the container, the meter may be calibrated in terms of "pounds of pressure or vacuum."

It should be pointed out that while applicant has disclosed a bench-type gauging device, it should be understood that the apparatus could likewise be used in a system where the containers are conveyed to the gauging head or support 10 in a sequence. Furthermore, rather than having a voltage output providing an indication, any suitable reject mechanism could be energized in response to a predetermined output voltage, indicative of the lack of sufficient vacuum to segregate improperly sealed containers.

Various modifications may be resorted to within the spirit and scope of the appended claims.

I claim:

1. Apparatus for indicating the pressure conditions within sealed containers having magnetically conducting end closures comprising a support, a generally U-shaped magnet carried by said support, the distance between the pole faces of said magnet approximating the radius of the end closure, a circular recess formed in the bottom of said support with one leg of said magnet terminating in alignment with the top surface of said recess, a Hall generator probe positioned beneath said one leg within said recess, and voltage measuring means connected to said probe for providing an indication of the flux density of the magnetic field formed between said one leg of said magnet and a container closure over which the support is placed.

2. Apparatus for indicating the pressure conditions within sealed containers having magnetically conducting end closures comprising a support, a generally U-shaped magnet carried by said support, the distance between the pole faces of said magnet approximating the radius of the end closure, a Hall generator probe positioned beneath one leg of said magnet with its major axis parallel to the pole face of said magnet and voltage measuring means connected to said probe for providing an indication of the flux density of the magnetic field formed between said one leg of said magnet and a container closure over which the support is placed.

3. Apparatus for indicating the pressure conditions within sealed containers having magnetically conducting end closures comprising a support, a generally U-shaped magnet having parallel pole faces carried by said support, one pole face of said magnet being in alignment with the center of a closure when the support is placed thereon, and the other pole face being in contact with the rim of the closure, a Hall generator probe positioned beneath said one pole face, and voltage measuring means connected to said probe for providing an indication of the flux density of the magnetic field formed between said one pole face of said magnet and a container closure over which the support is placed.

References Cited in the file of this patent

UNITED STATES PATENTS

| | | |
|---|---|---|
| 2,445,176 | Hoffman | July 13, 1948 |
| 2,608,089 | Raymond et al. | Aug. 26, 1952 |
| 2,987,669 | Kallmann | June 6, 1961 |
| 3,064,807 | Stover | Nov. 20, 1962 |

OTHER REFERENCES

Publication: Westinghouse Engineer, May 1957, article by Lawson, "The Hall Effect," pages 71, 72.